United States Patent Office 3,487,119
Patented Dec. 30, 1969

3,487,119
PRODUCTION OF 3,4,5-TRIMETHYL-1-SECONDARY ALKYL BENZENES
Alan H. Peterson, Littleton, Colo., assignor to Marathon Oil Company, Findlay, Ohio, a corporation of Ohio
No Drawing. Continuation-in-part of application Ser. No. 665,936, Sept. 6, 1967. This application Mar. 15, 1968, Ser. No. 713,319
Int. Cl. C07c 3/56
U.S. Cl. 260—671     11 Claims

ABSTRACT OF THE DISCLOSURE

The present invention comprises a process for the production of 3,4,5-trimethyl-1-secondary alkyl benzene from 1,2,4-trimethyl benzene comprising in combination the steps of:

(a) Secondary alkylation of 1,2,4-trimethyl benzene,
(b) Cocurrent isomerization so as to form as the alkylated product 3,4,5-trimethyl-1-secondary alkyl benzene,
(c) Recovery from the resulting mixture of 3,4,5-trimethyl-1-secondary alkyl benzene wherein at least *a* and *b* above are conducted in the presence of a strong, substantially anhydrous Friedel-Crafts catalyst.

Cross references to related applications

This application is a continuation-in-part of my co-pending United States patent application Ser. No. 665,936, filed Sept. 6, 1967, itself a continuation of Ser. No. 457,521 filed May 20, 1965 both of which applications are now abandoned.

Background of the invention

My invention relates to the production of 3,4,5-trimethyl-1-secondary alkyl benzene from 1,2,4-trimethyl benzene.

Summary of the invention

The present invention relates to new methods for the preparation of certain alkylbenzenes, and in particular, relates to the preparation of 3,4,5-trimethyl-1-secondary alkylbenzenes and also to the preparation of 1,2,3-trimethylbenzene.

By utilizing an unexpected isomerization which occurs concurrently with alkylation under certain conditions, the present invention forms the above mentioned products from non-corresponding alkylbenzenes.

While 3,4,5-trimethyl-1-isopropylbenzene may be conventionally obtained by direct propylation of 1,2,3-trimethylbenzene, the latter compound is present as only a small fraction in most commercial refinery streams and is, therefore, relatively expensive. The present invention permits the substitution of relatively cheap, readily available pseudocumene (1,2,4-trimethylbenzene) for the less available 1,2,3-trimethylbenzene starting material, without need for any additional steps.

The 3,4,5-trimethyl-1-secondary alkylbenzenes, particularly 3,4,5-trimethyl-1-isopropylbenzene, are of interest as chemical intermediates in the formation of such materials as 3,4,5-trimethyl-alpha-methyl styrene, 3,4,5-trimethyl phenol, and analogous compounds.

The new process is carried out in the presence of from 0.01 to 5, more preferably from 0.05 to about 2 and, most preferably 0.1 to 1.1 moles per mole of 1,2,4-trimethylbenzene of a strong Friedel-Crafts catalyst preferably $AlBr_3+HBr$, $BF_3$ complexed with $H_3PO_4$ or with HF or most preferably $AlCl_3+HCl$. An inert reaction media, such as fluorocarbon, paraffin, cycloparaffin or preferably carbon disulfide is preferably employed in most instances.

The secondary alkyl group may be added as an olefin, e.g., propylene or 1- or 2-butylene or most preferably may be added as a secondary alkyl halide, most preferably isopropylchloride.

The preferred temperature during the reaction will vary with the particular catalyst and solvent system used. For $AlCl_3$ the preferred range is about 20 to 100° C. and 40 to 60° C. is particularly preferred. Higher temperatures are required for $BF_3$ complexes with $H_3PO_4$ and other acids, and 90 to 175° C. are preferred. The contact time is not narrowly critical and may range from about 1 minute to 10 hours. In most instances reaction times of from 15 minutes to about 2 hours will be preferred.

If the temperature is permitted to go below the above preferred levels or if the other conditions described above are not present, the correspoanding 2,3,5-trimethyl-1-secondary alkylbenzene and 2,4,5-trimethyl-1-secondary alkylbenzene will be formed in quantities which will increase with further deviations from the above specified conditions.

By strong Friedel-Crafts catalyst is meant aluminum chloride plus HCl (formed in situ from secondary alkyl chloride or water or added as dry gas), aluminum bromide plus HBr, $BF_3$ (complexed with acids such as phosphoric, sulfuric, phenol, or HF) and other catalyst systems generally known to strongly catalyze reactions in the conventional Friedel-Crafts manner.

Commercial anhydrous grades of aluminum chloride or aluminum bromide are sufficiently pure to be used for most of the purposes of the present invention without purification or drying. While, as mentioned above, some water may be added in order to form HCl or HBr, the water added should preferably not be in excess of that necessary to activate the Friedel-Crafts catalyst to maximum efficiency and must not be sufficient to significantly weaken the catalytic activity. In most cases, no water need be added to commercial grades of Friedel-Crafts catalysts and in general, the catalysts of the present invention should contain less than about 10%, more preferably less than about 5%, and most preferably less than about 2% water based on the weight of the catalyst. It is not desirable for the purposes of this invention to add (or to allow the "anhydrous" aluminum chloride or aluminum bromide to pick up from the air) substantial quantities of water since it has been reported that addition of relatively large quantities of water (e.g. about 35% by weight based on the aluminum chloride) causes formation of 2,4,5-trimethyl-1-isopropyl benzene as the exclusive product (see U.S. Patent No. 3,132,189 to Eugene F. Lutz).

While not narrowly critical, from about 0.5 to about 1.1 moles of alkylating agent and about 0.1 to 1.1 moles of catalyst per mole of reacting alkyl aromatic will be preferred.

While the preferred secondary alkyl group is isopropyl, other secondary alkyl groups (including among others, isobutyl and isohexyl) are operative in the processes of the present invention.

Because of the greater availability of the 1,2,4-trimethyl isomer of benzene, the present invention is valuable as a method for permitting the conversion of this isomer into the less available 1,2,3-trimethylbenzene. This is accomplished by first performing the concurrent isomerization-alkylation reaction as described above and thereafter dealkylating the resulting product. This dealkylation is conducted conventionally under mild conditions in order not to cause further isomerization or degradation of the compounds. Preferred conditions for the dealkylation are from about 250 to 350° C. at a liquid hourly space velocity of about 0.5 to 5 with a conventional dealkylation catalyst and using a diluent such as nitrogen or steam to reduce the contact time to about 0.5 to 10 seconds. Useful dealkylation catalysts include among others: silica-alumina, silica-boria, alumina activated with fluoride ion, and bauxite. Although a batch basis can be used, a continuous process conducted in a flow-type reactor will be preferred.

The following Examples I and IV are intended to illustrate the invention but should not be taken as limiting it in any manner. All apparent variations and modifications are to be included within the claims appended hereto. Examples II and III illustrate the importance of the nature of the alkyl group being introduced.

Example I

Preparation of 3,4,5-trimethyl-1-isopropylbenzene according to the method of the present invention:

A solution of 70 ml. (0.5 mole) 1,2,4-trimethylbenzene in 200 ml. $CS_2$ is placed in a 500 ml. 3-necked flask fitted with a reflux condenser and a calcium chloride drying tube, a dropping funnel and a mechanical stirrer. 66.65 g. (0.5 mole) of $AlCl_3$ is added to this solution. Then 46 ml. (0.5 mole) isopropylchloride is added to the flask via the dropping funnel at a rate which maintains a gentle reflux in the flask. After all of the isopropyl chloride is added, the mixture is refluxed for 2 hours. Workup consists of pouring the cooled product mixture into ice water and separating the aqueous and organic phases. The water layer is extracted twice with ether and the ether and carbon disulfide layers are combined and dried over anhydrous calcium chloride. Thereafter the ether and carbon disulfide are distilled off at atmospheric pressure and the remaining material is distilled through an 18-inch packed column to obtain 28.5 g. of crude 3,4,5-trimethyl-1-isopropylbenzene boiling between 107 and 111° C. at 21 mm. of mercury. Subsequent purification by repeated distillation provides approximately 23.1 g. of material which is shown by gas liquid chromatography and nuclear magnetic resonance spectroscopy to be 3,4,5-trimethyl-1-isopropylbenzene.

Example II

When ethylchloride is substituted for isopropylchloride in Example I, the product is a mixture of 2,4,5-trimethyl-1-ethylbenzene and 2,3,5-trimethyl-1-ethylbenzene and contains essentially none of the desired 3,4,5-trimethyl-1-ethylbenzene.

Example III

When tertiary butylchloride is substituted for isopropylchloride in Example I, essentially no trimethylbutylbenzenes are formed under these conditions.

Example IV

A feed mixture consisting of 83% of 3,4,5-trimethyl-1-isopropylbenzene together with isomeric materials is fed at the rate of 0.2 cc./min. in a stream of nitrogen fed at 50 cc./min. to 14 cc. of silica-alumina cracking catalyst maintained at 300° C. After 8 minutes, 0.98 g. of product mixture is collected which is determined by gas-liquid chromatographic analysis to contain 42.7 weight percent of 1,2,3-trimethylbenzene, 24.9 weight percent of 1,2,4-trimethylbenzene, 0.6 weight percent 1,3,5-trimethylbenzene and 18.4 weight percent unreacted 3,4,5-trimethyl-1-isopropylbenzene.

What is claimed is:
1. A process for the production of 3,4,5-trimethyl-1-secondary alkyl benzene from 1,2,4-trimethylbenzene comprising in combination the steps of:
   (a) alkylating 1,2,4-trimethyl benzene at 20 to 175° C. with from about 0.5 to about 1.1 moles of alkylating agent per mole of 1,2,4-trimethyl benzene to add a secondary alkyl group thereto,
   (b) concurrently isomerizing to form as the alkylated product 3,4,5-trimethyl-1-secondary alkyl benzene,
   (c) recovering 3,4,5-trimethyl-1-secondary alkyl benzene from the resulting mixture wherein at least *a* and *b* above are conducted in the presence of about 0.1 to 2 moles per mole of 1,2,4-trimethyl benzene of a strong, substantially anhydrous Friedel-Crafts catalyst.

2. The process of claim 1 in which the secondary alkyl group inserted is isopropyl.

3. The process of claim 1 wherein the Friedel-Crafts catalyst comprises a compound selected from the group consisting of boron trifluoride, aluminum bromide and aluminum chloride.

4. The process of claim 1 wherein from 0.05 to about 2 moles of Friedel-Crafts catalyst are present for each mole of aromatic materials in the reaction mixture.

5. The process of claim 1 wherein the catalyst comprises aluminum chloride and the reaction temperature is about 20 to 100° C.

6. The process of claim 1 in which the catalyst is boron trifluoride complexed with an acid selected from the group consisting of HF and $H_3PO_4$ and the temperature is about 90 to 175° C.

7. The process of claim 1 wherein the Friedel-Crafts catalyst is aluminum chloride and wherein the alkylation is accomplished by causing the 1,2,4-trimethylbenzene to react with propylene and wherein from about 0.001 to about 1.0 mole of HCl are initially present in the reaction mixture for each mole of aluminum chloride.

8. The process of claim 2 wherein the alkylation is accomplished by causing the 1,2,4-trimethylbenzene to react with isopropylchloride.

9. A process for the production of 1,2,3-trimethylbenzene comprising in combination the steps of alkylating 1,2,4-trimethylbenzene as described in claim 1, and thereafter dealkylating under mild conditions the resulting 3,4,5-trimethyl-1-secondary alkylbenzene and recovering the 1,2,3-trimethylbenzene thus formed.

10. The process of claim 9 wherein the dealkylation is accomplished at a temperature of from about 200 to 400° C. in the presence of a dealkylation catalyst.

11. The process of claim 9 wherein the dealkylation reaction is carried out continuously in a flow-type reactor and the catalyst is selected from the group consisting of bauxite, alumina activated with fluoride ion and silica-alumina.

References Cited

UNITED STATES PATENTS 2,382,506 8/1945 Schulze.
2,754,341 7/1956 Kirkland.
3,168,583 2/1965 Kovach.

FOREIGN PATENTS 1,460,349 10/1966 France.

DELBERT E. GANTZ, Primary Examiner

C. R. DAVIS, Assistant Examiner

U.S. Cl. X.R

260—672